United States Patent [19]
Osaka et al.

[11] Patent Number: 6,063,512
[45] Date of Patent: May 16, 2000

[54] SOFT MAGNETIC THIN FILM HAVING CO, NI AND FE AS MAIN INGREDIENTS, METHOD OF MANUFACTURING THE SAME AND MAGNETIC HEAD AND MAGNETIC STORAGE UNIT USING THE SOFT MAGNETIC THIN FILM

[75] Inventors: Tetsuya Osaka; Madoka Takai; Hiroaki Tachibana, all of Tokyo, Japan

[73] Assignees: NEC Corporation; Waseda University, both of Tokyo, Japan

[21] Appl. No.: 09/006,484

[22] Filed: Jan. 13, 1998

[30] Foreign Application Priority Data

Jan. 13, 1997 [JP] Japan .................................. 9-003530

[51] Int. Cl.[7] ...................................................... G11B 5/66
[52] U.S. Cl. ...................... 428/694 T; 428/704; 428/900; 427/128; 427/129; 427/130; 360/113; 360/119; 360/126; 360/128; 360/131
[58] Field of Search ................................ 428/694 T, 900, 428/704; 427/128–130; 360/113, 119, 126, 128, 131

[56] References Cited

U.S. PATENT DOCUMENTS

| | | | |
|---|---|---|---|
| 3,354,059 | 11/1967 | Koretzky | 205/76 |
| 3,533,922 | 10/1970 | Semienko | 205/260 |
| 4,310,392 | 1/1982 | Kohl | 204/52 |
| 5,011,581 | 4/1991 | Omate | 204/38.4 |
| 5,570,251 | 10/1996 | Shinoura | 360/126 |

*Primary Examiner*—Leszek Kiliman
*Attorney, Agent, or Firm*—Sughrue, Mion, Zinn, Macpeak & Seas, PLLC

[57] ABSTRACT

A soft magnetic thin film for magnetic head has high saturation magnetization and at the same time high resistivity. There are provided a method of manufacturing the soft magnetic thin film and a magnetic head and a magnetic storage unit which use the soft magnetic thin film. At least one of lower and upper soft magnetic layers of magnetic head which define a magnetic circuit is formed of a soft magnetic thin film having as a main constituent a Co—Ni—Fe alloy consisting of 30 to 90 at % Co, less than 40 at % Ni and less than 40 at % Fe and containing at least S by 0.5 to 4 at %. The soft magnetic thin film is formed from a Co—Ni—Fe alloy plating solution containing metal salts of Co, Ni and Fe and additionally containing a sulfur system organic compound through electrodeposition process.

9 Claims, 8 Drawing Sheets

(a) REGION OF Bs ≥1.5T (b) REGION OF Hc ≦ 5Oe
SACCHARIN ADDED

SOFT MAGNETIC THIN FILM HAVING CO, NI AND FE AS MAIN INGREDIENTS, METHOD OF MANUFACTURING THE SAME AND MAGNETIC HEAD AND MAGNETIC STORAGE UNIT USING THE SOFT MAGNETIC THIN FILM

BACKGROUND OF THE INVENTION

The present invention relates to a material of a soft magnetic thin film for use in a magnetic head for recording/reproducing information on/from a magnetic disc device, a method of manufacturing the soft magnetic thin film, a magnetic head using the soft magnetic thin film and a magnetic storage unit using the magnetic head.

Conventionally, a Ni—Fe (permalloy) alloy plated film is generally used as a write head material but this Ni—Fe alloy plated film is disadvantageous in that it has a small saturation magnetic flux density Bs of 0.8 to 1.0 tesla (T). In addition, since the Ni—Fe alloy plated film has a small resistivity of 20 $\mu\Omega$cm, the phase of a recording magnetic field is delayed owing to an eddy current during high-frequency recording and disadvantageously recording characteristics are deteriorated.

Accordingly, for the purpose of realizing ultrahigh density recording, a magnetic pole material for magnetic head having a larger saturation magnetic flux density than that of at least the Ni—Fe alloy and a high resistivity has been desired to be developed.

To solve the above problems, the following literatures have already reported a Co—Fe (Permendur) system film or a Co—Ni—Fe (Perminvar) system film.

Firstly, IEEE Transactions on Magnetics, by S. H. Liano, Vol. Mag-23, No. 5, pp-2981–2983 (hereinafter called prior art 1) discloses that better characteristics or properties can be obtained when Co—Fe is used for a magnetic pole piece of a magnetic head than when Ni—Fe is used.

Also, Magnetic Recording Research Meeting of the Institute of Electronics Information and Communication Engineers of Japan, by Omata, MR 88-23 (1988) (hereinafter referred to as prior art 2) describes that a Co—Ni—Fe thin film for use in a magnetic head is formed through evaporation and alloy electrodeposition process.

Also, Journal of The Japan Society of Applied Magnetics, by Shinoura et al, Vol. 18, No. 2, page 277 (1994) (hereinafter called prior art 3) shows a Co—Ni—Fe alloy electrodeposited film for magnetic head.

Further, JP-A-60-82638 (hereinafter called prior art 4) discloses a ternary alloy thin film consisting of, by weight %, Ni$\leq$75%, 10 to 90% Co and Fe$\leq$15%, having magnetostriction in the range of $\pm 2 \times 10^{-6}$ and coercive force Hc$\leq$10 Oe and being used in a magnetic core of a thin film magnetic head.

Further, JP-A-62-71015 (hereinafter called prior art 5) discloses that in a thin film magnetic head having upper and lower magnetic films, each of the upper and lower magnetic films is formed of an alloy thin film consisting of, by weight, 3 to 30% Ni, 62 to 95% Co and 2 to 8% Fe and having a face-centered cubic (FCC) structure.

Further, JP-A-2-68906 (hereinafter referred to as prior art 6) discloses a soft magnetic film made of an alloy consisting of, by atomic %, 20 to 70% Ni, 5 to 45% Co and 20 to 75% Fe and added with less than 5% Cr, Ti, Zr and Hf.

The above prior arts show that with the Co—Fe film or the Co—Ni—Fe plated film, a saturation magnetic flux density Bs of, for example, 1.8 T can be obtained which is higher than that of the conventional Ni—Fe (permalloy) film.

However, the above prior arts in no way refer to the resistivity and fail to disclose any solution to the aforementioned increasing resistivity.

More particularly, the above prior arts disclose the magnetic pole material which has a high saturation magnetization (Bs) in order that sufficient information can be written to a recording medium having a high coercive force for the purpose of realizing high-density recording. However, the prior arts do not disclose any magnetic pole material which has a high resistivity in addition to the high saturation magnetization to cope with such a problem encountered in high-frequency recording during high-density recording that eddy current is caused owing to the small resistivity of the conventional material (for example, 20 $\mu\Omega$cm of the permalloy film), with the result that the phase of a recording magnetic field is delayed and recording characteristics or properties of the magnetic head are deteriorated.

SUMMARY OF THE INVENTION

An object of the present invention is to provide a soft magnetic thin film for magnetic head having a high saturation magnetization and at the same time a high resistivity and a method of manufacturing the soft magnetic thin film. Specifically, the soft magnetic thin film for magnetic head according to the present invention can realize magnetic characteristics which satisfy saturation magnetization Bs indicated by 2.0 T$\geq$Bs$\geq$1.5 T, resistivity $\rho$ indicated by 425 $\mu\Omega$cm$\geq\rho\geq$30 $\mu\Omega$cm and coercive force Hc indicated by of Hc$\leq$50 Oe.

Another object of the present invention is to provide a magnetic head and a magnetic storage unit which use the above soft magnetic thin film.

To accomplish the above objects, according to the present invention, a Co—Ni—Fe soft magnetic thin film containing at least S by 0.5 to 4 at % S in terms of atomic % and having a Co, Ni and Fe ternary composition consisting of, by atomic %, 30 at %$\leq$Co$\leq$90 at %, 0 at %<Ni$\leq$40 at % and 0 at %<Fe$\leq$40 at % is formed on at least a part of a lower soft magnetic layer or an upper soft magnetic layer which defines a magnetic circuit of a magnetic head by using a plating solution containing a sulfur system organic compound and consisting of metal salts of Co, Ni and Fe to thereby form the magnetic head, thus ensuring that excellent magnetic head and magnetic storage unit can be realized which have high Bs and high resistivity magnetic poles and high-density and high-frequency recording characteristics.

In other words, according to the present invention, there is provided a soft magnetic thin film having as main ingredients Co, Ni and Fe which is made of a Co—Ni—Fe alloy consisting of, by atomic %, 30 to 90 at % Co, less than 40 at % Ni and less than 40 at % Fe and contains at least S by 0.5 to 4 at % in terms of atomic %.

According to the present invention, a Co—Ni—Fe alloy plating solution is provided which consists of metal salts of Co, Ni and Fe and additionally contains a sulfur system organic compound.

Preferably, in the Co—Ni—Fe alloy plating solution, the sulfur system organic compound is at least one kind of thiourea, aminothiathol and thiodiglycollic acid and preferably, at least one kind of surfactant and boric acid is added as an addition agent.

According to the present invention, in a method of manufacturing a soft magnetic thin film having as main ingredients Co, Ni and Fe, the soft magnetic thin film is formed by using any one of the above Co—Ni—Fe alloy plating solutions through electrodeposition process under the condition that the pH value is 2 to 6, the temperature is 20° C. to 40° C. and the current density is 1 to 30 mA/cm$^2$, wherein during the electrodeposition process, a magnetic field is applied in a predetermined direction to the soft magnetic thin film to be formed.

According to the present invention, a magnetic head comprises a lower soft magnetic layer and an upper soft magnetic layer which define a magnetic circuit, a coil layer formed of an electrically conductive thin film material which crosses the lower and upper soft magnetic layers, a gap layer or an inter-layer insulating layer formed of a non-magnetic insulating material, and electrodes for conducting drive current to the coil layer, wherein at least one of the lower and upper soft magnetic layers is formed of a soft magnetic film having as a main constituent a Co—Ni—Fe alloy and containing as a sub-constituent S which is of 0.5 to 4 at % of the total content.

Further, according to the present invention, a magnetic head is provided wherein at least one of the lower and upper soft magnetic layers defining a magnetic circuit of the magnetic head has a part of magnetic pole end at a medium opposing side surface, which part is made of a first soft magnetic thin film material having as a main constituent a Co—Ni—Fe alloy film and containing as a sub-constituent S which is of 0.5 to 4 at %, and the remaining part of the magnetic circuit is made of a second soft magnetic thin film material which is different from the first soft magnetic thin film material.

Preferably, in the magnetic head of the present invention, the second soft magnetic thin film material includes a Ni—Fe plated film.

According to the present invention, the magnetic head is composite with a reproducing head utilizing the magnetoresistive effect of a single layer or a multilayer of ferromagnetic soft magnetic thin film.

Further, according to the present invention, a magnetic storage unit comprises a magnetic recording medium having at least a plurality of tracks for data recording, a magnetoresistive effect element for detecting a magnetic field leaking from magnetic information recorded on the magnetic recording medium, a write magnetic head for recording information on the recording medium, electrically conductive lead lines for connecting the magnetoresistive effect element and the write magnetic head to an external circuit, actuator means for moving the magnetoresistive effect element and the write head to a predetermined track on the magnetic recording medium, wherein the magnetic recording medium has a coercive force of more than 2000 Oe, a magnetic pole material constituting a magnetic circuit of the write head is a soft magnetic thin film essentially consisting of S which is in the range of 0.5 to 4 at % and a remainder of an alloy having as main ingredients Co, Ni and Fe and consisting of, by atomic %, 30 to 90 at % Co, less than 40 at % Ni and less than 40 at % Fe.

DESCRIPTION OF THE PREFERRED EMBODIMENTS

The invention will now be described by way of example with reference to the accompanying drawings.

(First Embodiment)

Figure 1:
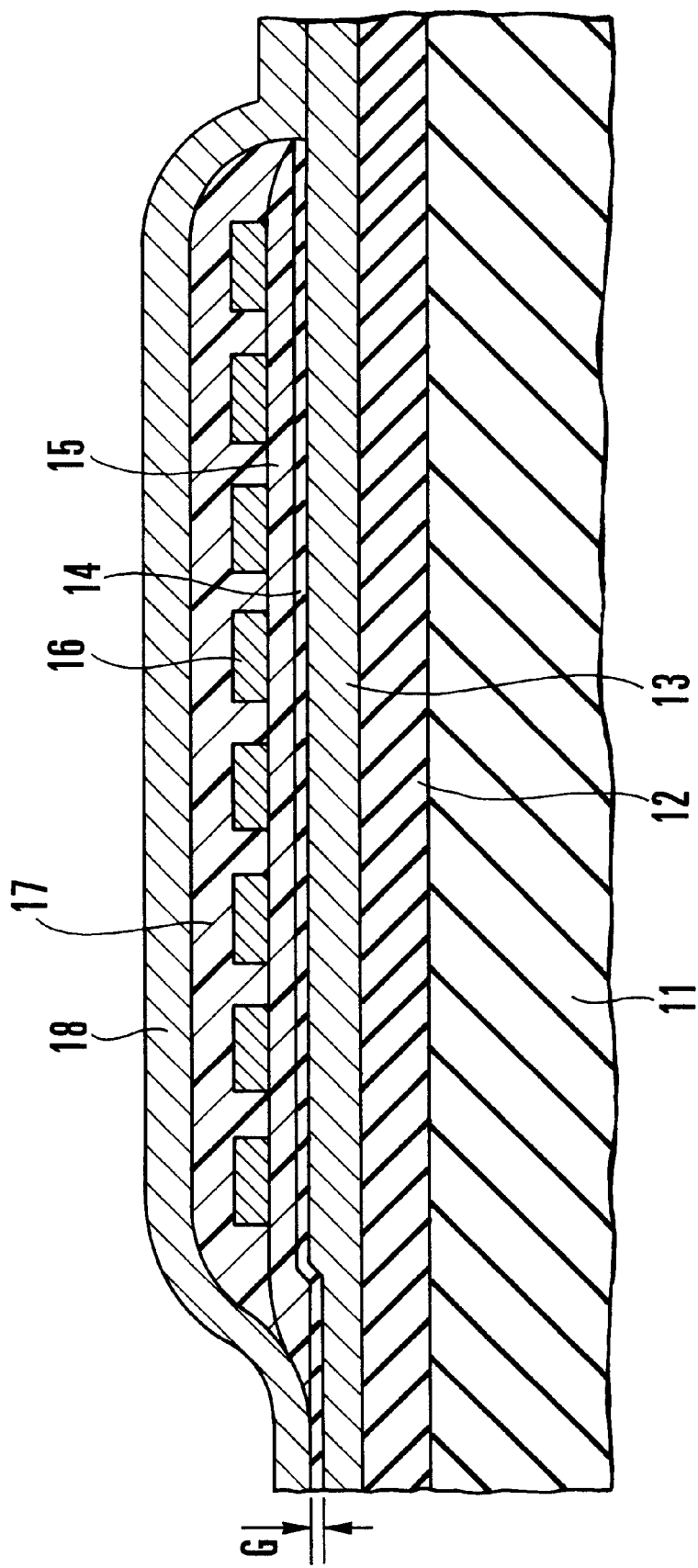
FIG. 1 is a sectional view showing the essential part of a magnetic head according to a first embodiment of the present invention.

The essential part of a magnetic head according to a first embodiment of the present invention is illustrated, in sectional form, in FIG. 1. The magnetic head shown in FIG. 1 has an upper magnetic layer 18 and a lower magnetic layer 13 and at least one of the upper and lower magnetic layers is formed of a soft magnetic plated film having as main ingredients Co, Ni and Fe (where Co is in the range indicated by 30 at %≦Co≦90 at % in terms of atomic %, Ni is in the range indicated by 0 at %<Ni≦40 at % and Fe is in the range indicated by 0<Fe≦40 at %) and containing at least S by 0.5 to 4 at % in terms of atomic %. The remaining part is formed, as will be described below, pursuant to, for example, the process of manufacturing a thin film magnetic head described in connection with FIG. 2 of "Plated High Saturation Magnetic Flux Density Material for Thin Film Magnetic Head" by Osaka Tetsuya et al, Electronic Materials, November 1994, pp.41–46, published by Kohgyo Chohsa-kai.

More particularly, an insulating (for example, alumina) layer 12 having a thickness of several μm to several of tens of μm is formed on a substrate 11 of ceramics such as Al$_2$O$_3$—TiC by sputtering. Subsequently, a Ti/Ni—Fe laminated film (not shown) in which the Ti layer has a thickness of 2 nm and the Ni—Fe layer has a thickness of 100 nm is formed by sputtering to provide a plating underlayer. Thereafter, photoresist (hereinafter simply referred to as PR) is coated and exposed to light to form a predetermined photoresist pattern corresponding to a predetermined shape of the lower magnetic layer 13. Next, a soft magnetic film is precipitated through electroplating process, thereby forming the lower magnetic layer 13 through so-called frame plating process. This soft magnetic film has as main ingredients Co, Ni and Fe (where 30 at %≦Co≦90 at %, 0 at %<Ni≦40 at % and 0 at %<Fe≦40 at %) and contains at least S by 0.5 to 4 at %, and the plating bath essentially contains metal salts of Co, Ni and Fe, an electrically conductive salt such as ammonium sulfate for making a plating solution electrically conductive and a sulfur system organic compound for controlling the structure and grain size of the film and may be added with surfactant such as lauryl sulfuric acid and boric acid.

After the lower magnetic layer 13 is formed, an insulating layer defining a predetermined gap length G (gap layer) 14 is formed by sputtering. The material of the gap layer is alumina. Thereafter, to eliminate stepped portions on the lower magnetic layer 13, an organic layer 15 made of PR is formed and then a coil 16 of electrically conductive material in the form of a copper plated film is formed. Subsequently, to eliminate stepped portions between turn conductors of the coil 16, an organic layer 17 made of PR is formed.

Thereafter, like the lower magnetic layer 13, the upper magnetic layer 18 in the form of a soft magnetic film having as main ingredients Co, Ni and Fe (where Co is in the range indicated by 30 at %≦Co≦90 at %, Ni is in the range indicated by 0 at %<Ni≦40 at % and Fe is in the range indicated by 0 at %<Fe≦40 at %) and containing at least S by 0.5 to 4 at % is formed, thus completing a device part of the thin film magnetic head. Finally, an alumina sputtered film (not shown) having a thickness of several of tens of μm and adapted to protect the device part of the thin film magnetic head is formed, thereby completing a thin film magnetic head element.

After the thin film magnetic head element is completed, the element is cut from a wafer and is subjected to predetermined polishing working so as to be formed into a slider. Then, lead wiring lines or a suspension is mounted to the slider through working process disclosed in, for example, JP-A-7-262519 to complete a magnetic head.

The soft magnetic film according to the first embodiment is a soft magnetic film formed through electroplating process and having as main ingredients Co, Ni and Fe (where 30 at %≦Co≦90 at %, 0 at %<Ni≦40 at % and 0 at %<Fe≦40 at %) and containing at least S by 0.5 to 4 at %. With this construction, high Bs (≧1.5 T), low coercive force (≦5 Oe) and high resistivity (namely, 30 μΩcm≦resistivity≦425 μΩcm) can be realized.

Essentially, the soft magnetic film according to the first embodiment is electrodeposited from a plating solution containing metal salts of Co, Ni and Fe, an electrically conductive salt such as ammonium sulfate for making the plating solution electrically conductive and a sulfur system organic compound for controlling the structure and grain size of the film, and as necessary, the plating solution may be added with surfactant such as lauryl sulfuric acid and boric acid.

The concentration of magnetic metal ions in the plating solution is approximately 0.0 to 0.1 mol/dm³ for Co and Fe, and as a creterion, the Ni ion concentration is twice or 10 times the Fe ion concentration. The amount of addition of the sulfur organic compound is 0.01 g/l to 0.1 g/l. Even below or above the aforementioned value, the coercive force (Hc) disadvantageously increases.

Further, the plating solution preferably has a pH value of 2 to 6. This is because when the pH value is in a range exceeding 6, a hydroxide of metal ions is generated to make the bath unstable and when the pH value is not greater than 2.0, a great amount of hydrogen is generated and the rate of precipitation is extremely decreased to degrade the productivity.

The plated film is formed by precipitation through constant current electrodeposition process under the condition that current density is in the range of 1 to 30 mA/cm². Below the current density range, the efficiency of precipitation is disadvantageously decreased but in excess of that range, the film stress is increased, making it difficult to obtain a film of uniform quality.

The plating solution has a temperature of from 20 to 40° C. This is because at a temperature being not greater than 20° C., the precipitation rate is decreased, leading to degradation of the productivity but a temperature in excess of 40° C., the uniformity of the formed film is impaired, disadvantageously leading to degradation of magnetic characteristics or properties.

Preferably, during plating, the plating solution is suitably stirred. The condition for stirring depends on the shape and size of a used plating tank, the size of an object to be plated (for example, the size of a magnetic head wafer and the number of wafers to be plated at a time) and therefore it must be optimized.

Figure 2:
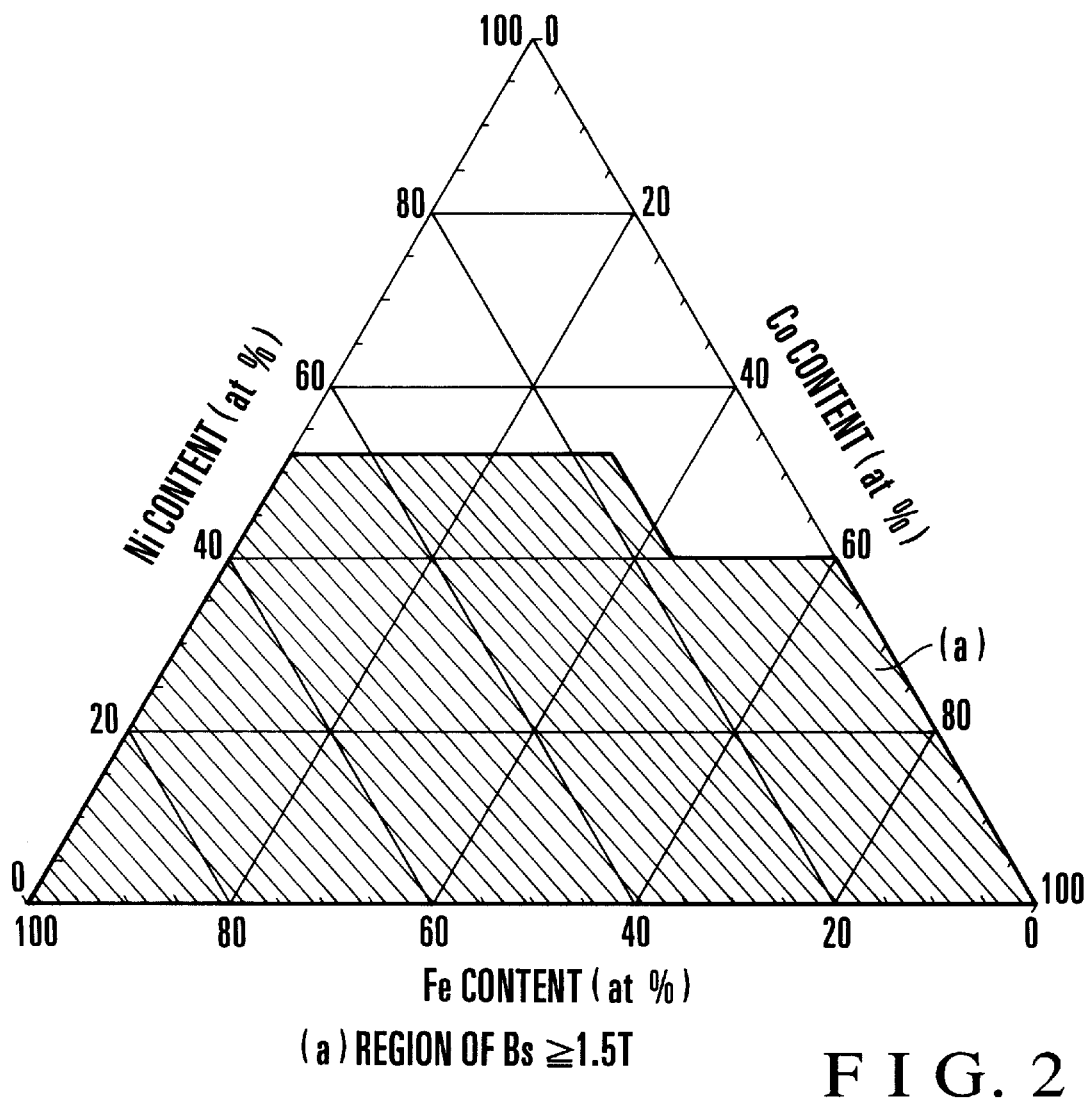
FIG. 2 is a ternary composition diagram of saturation magnetization Bs of a Co—Ni—Fe alloy.

FIG. 2 is a ternary composition diagram of saturation magnetization Bs of the Co—Ni—Fe system. Within a region (a) hatched in FIG. 2, high saturation magnetization indicated by Bs≧1.5 T can be realized.

Figure 3:
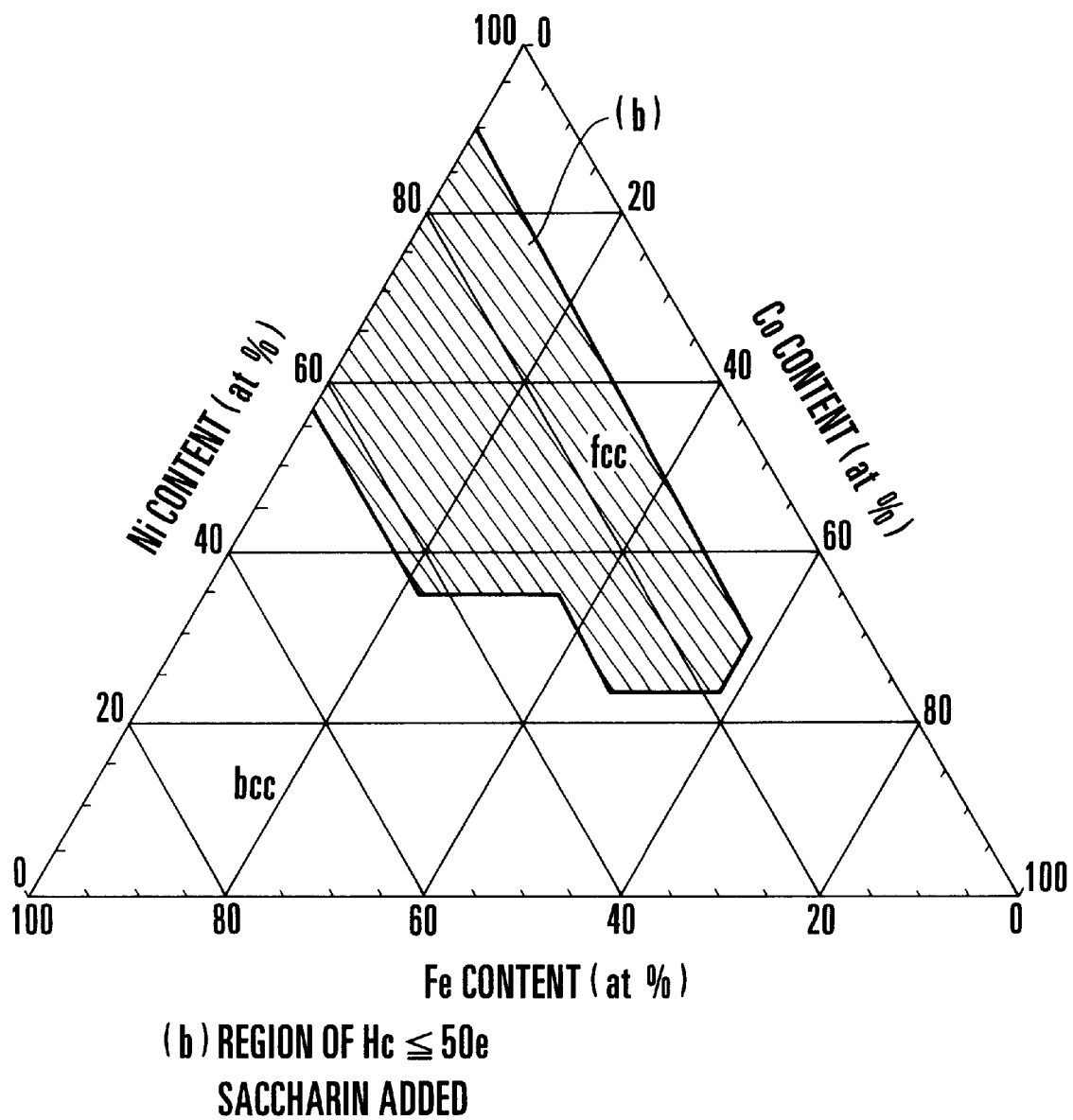
FIG. 3 is a ternary composition diagram showing results of measurement of coercive force Hc of a comparative Co—Ni—Fe film formed by using saccharin as bath addition agent.

From the standpoint of low coercive force important for the soft magnetic film, a comparative Co—Ni—Fe film is formed by using an addition agent (saccharin) generally used in the past and results of measurement of coercive force of this film are shown in FIG. 3. A comparison of the range of low coercive force in FIG. 3 with the range of high Bs in FIG. 2 shows that the range in which low coercive force (≦5 Oe) is obtained does not predominantly overlap the range of high Bs (≧1.5 T) and a region within which the Bs is high (≧1.5 T) and the coercive force is low (≦5 Oe) is narrow. Further, the present inventors have measured the resistivity in the region of high Bs and low coercive force to find that in the region of high Bs and low Hc, the resistivity is approximately 20 to 25 μΩcm at the most and resembles that of the conventional permalloy film (20 μΩcm) to make it difficult to improve the high-frequency recording characteristics.

Thus, a ternary soft magnetic film of Co—Ni—Fe is manufactured with the addition agent changed to thiourea, and coercive force of this film is measured. Results of the measurement are shown in FIG. 4.

Figure 4:
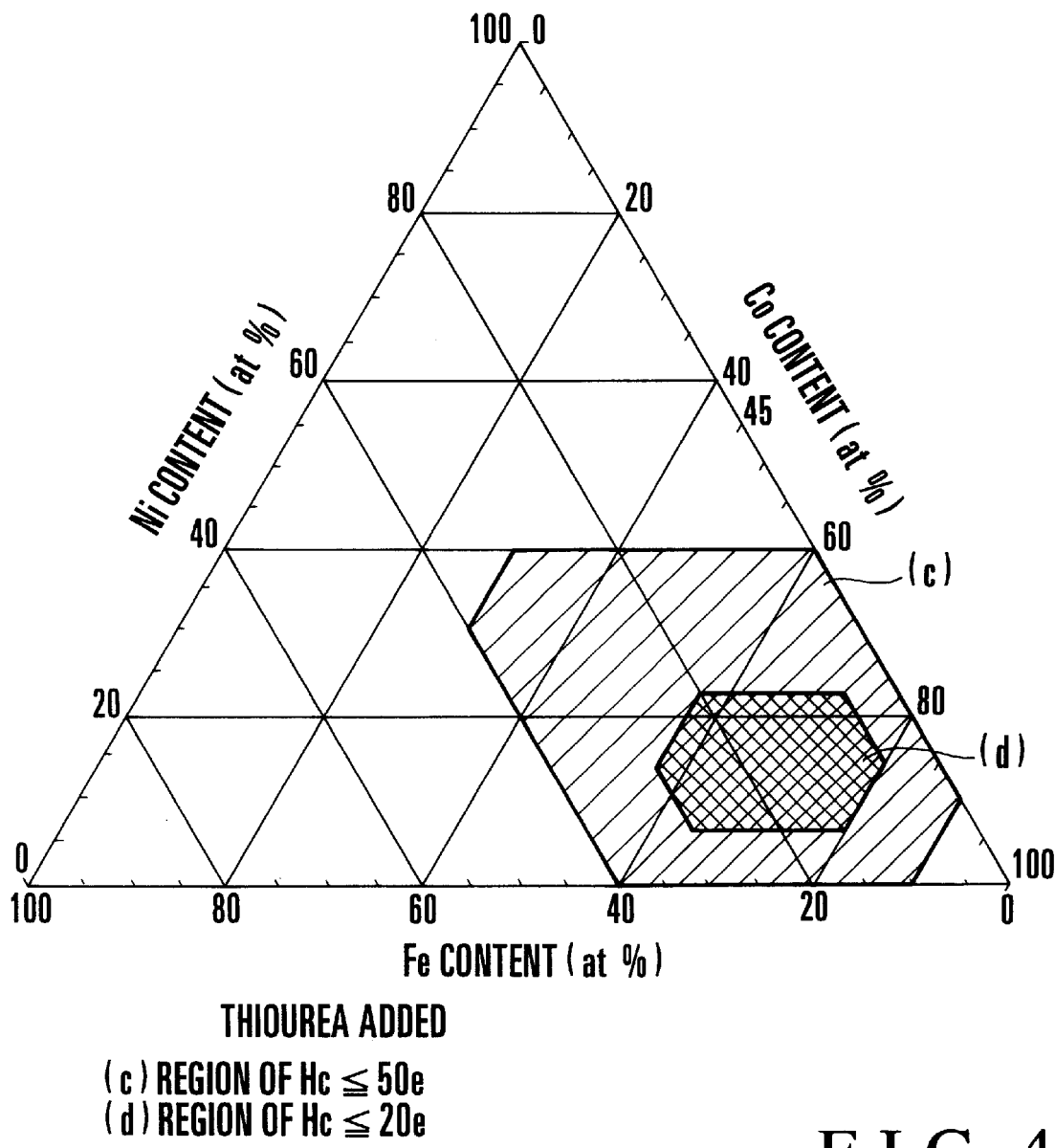
FIG. 4 is a ternary composition diagram showing results of measurement of coercive force Hc of a Co—Ni—Fe film formed by using thiourea as bath addition agent in the first embodiment of the present invention.

In FIG. 4, a hatched region (c) indicates a region of a coercive force which is of ≦5 Oe and a double hatched region (d) indicates a region within which the coercive force is less than 2 Oe. Then, a comparison of the region in FIG. 4 with the region in FIG. 2 indicating the saturation magnetization Bs of the Co—Ni—Fe ternary film shows that being different from the region obtained with the addition of saccharin in FIG. 3, the region obtained with the addition of thiourea in FIG. 4 is predominantly included in the region (a) in FIG. 2. Though not clearly illustrated in FIG. 4 showing Hc, the Bs has a value of more than 1.8 T in the double hatched region (d) within which a low coercive force of less than 2 Oe can be obtained, proving that a desirable characteristic of the magnetic head material can be obtained in this region.

As described above, it has been proven that by using thiourea as the addition agent, high Bs and low coercive force can be realized. Similar results can be obtained by using a sulfur system organic compound, for example, aminothiazole or thioglycochollic acid.

With the above magnetic characteristic evaluation results in mind, measuring experiments of the resistivity which the present invention principally aims, especially, the dependency of resistivity on the content of sulfur has been studied.

Figure 5:
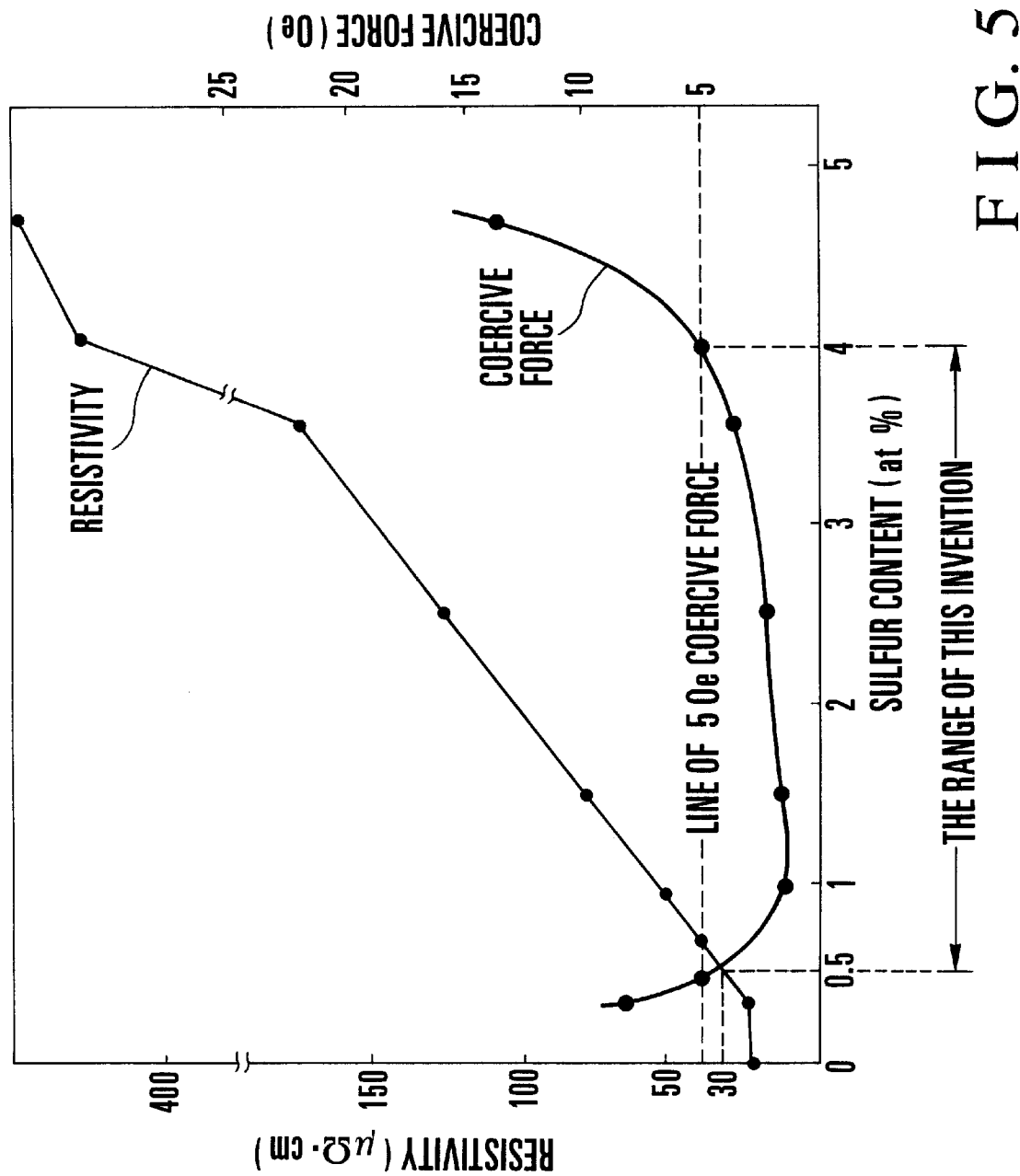
FIG. 5 is a graph showing the relation between the content of sulfur in the Co—Ni—Fe film and the coercive force and resistivity in the first embodiment of the present invention.

Referring to FIG. 5, an example of the results is illustrated. As is clear from FIG. 5, a film containing sulfur by a content of 0.5 at % has a resistivity of 30 μΩcm which is larger than 20 μΩcm of the permalloy film and 25 μΩcm of a film formed through plating bath using saccharin as the addition agent, and the resistivity increases as the content of S increases, reaching a very large value of 450 μΩcm at a content of 4.8%. But, results of measurement of coercive force carried out concurrently demonstrate that the content of S is limitative. More specifically, the coercive force once decreases as shown in FIG. 5 and takes a value of 5 Oe at a content of S of 0.5 at % and a minimum value of 0.8 Oe at a content of S of about 1 at %. Thereafter, as the content of S increases, the coercive force increases gradually to take a value of 5 Oe at a content of S of 4 at %. In excess of this content, the coercive force increases abruptly to reach about 14 Oe at a content of S of 4.8 at %, resulting in unsuitability for the magnetic head pole material.

As will be seen from the above, in the Co—Ni—Fe soft magnetic film formed through plating bath using the sulfur organic compound, such as thiourea, as the addition agent, the higher resistivity ($\geq 30$ $\mu\Omega$cm) than that of the conventional permalloy film can be obtained and a good coercive force characteristic of less than 5 Oe can be realized in the range of sulfur content in the film of from 0.5 at % to 4 at %.

For comparison, in the plating bath using saccharin as the addition agent, the content of S is tried to be increased by changing the amount of saccharin variously, the sulfur content is limited to less than 0.3 at % and increasing resistivity cannot be realized.

The reason why the resistivity is increased by increasing the content of sulfur (S) as described above is not certain but observation by a transmission electron microscope has showed that a film of a content of S of 0.3 at % (20 $\mu\Omega$cm resistivity and 6.5 Oe coercive force) has a grain size of 30 nm which is larger than a gain size of less than 10 nm of a film having a S content of 1 at % (55 $\mu\Omega$cm resistivity and 1.00 Oe coercive force). Accordingly, it is presumed that in the film of the low S content, crystal magnetic anisotropy of the magnetic phase is large to exhibit a high coercive force, with the result that electron scattering at the grain boundary is suppressed to provide a low resistivity. Conversely, in the film of the S content being 1.0 at %, the grain size is small and the crystal magnetic anisotropy is small to exhibit a low coercive force, with the result that electron scattering at the grain boundary is increased to increase the resistivity.

Further, the reason why the coercive force is increased abruptly when the S content exceeds 4 at % is uncertain but presumably, the abrupt increase has relation to the fact that when the S content exceeds 4 at %, the film stress increases remarkably and consequently the coercive force is increased or the magnetic phase is isolated by stress induction anisotropy.

(Second Embodiment)

Figure 6:
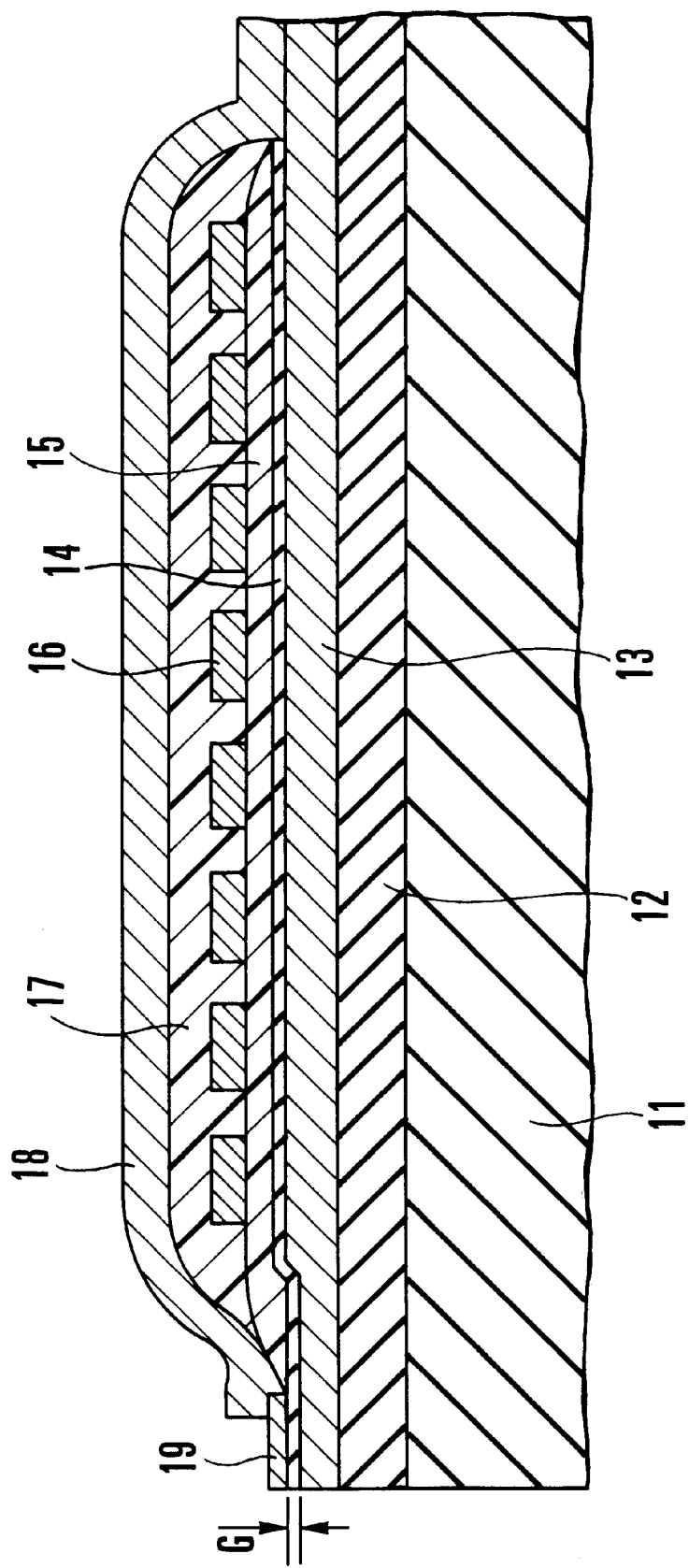
FIG. 6 is a sectional view showing the essential part of a magnetic head according to a second embodiment of the present invention.

Referring to FIG. 6, the essential part of a magnetic head according to a second embodiment of the present invention is illustrated therein in sectional form. As shown in FIG. 6, at least one of an upper magnetic layer 18 and a lower magnetic layer 13 has a part of a medium opposing surface which is formed of a pattern 19 of a soft magnetic plated film having as main ingredients Co, Ni and Fe (where 30 at %$\leq$Co$\leq$90 at %, 0 at %<Ni$\leq$40 at % and 0<Fe$\leq$40 at %) and containing at least S by 0.5 to 4 at %.

In the second embodiment of FIG. 6, an example is disclosed in which the magnetic plated film pattern according to the embodiment of the present invention is inserted to only the upper magnetic layer. The remaining part is formed pursuant to a thin film magnetic head manufacture process similar to that described previously, so that excepting the process for formation of the soft magnetic plated film pattern 19, the process described in connection with the magnetic head of the first embodiment can be employed. Like the upper and lower magnetic layers, the soft magnetic plated film pattern 19 can be formed through the frame plating process and the plating bath composition and the plating condition are similar to those in the soft magnetic film formation process described in connection with the first embodiment of the present invention.

(Third Embodiment)

Figure 7:
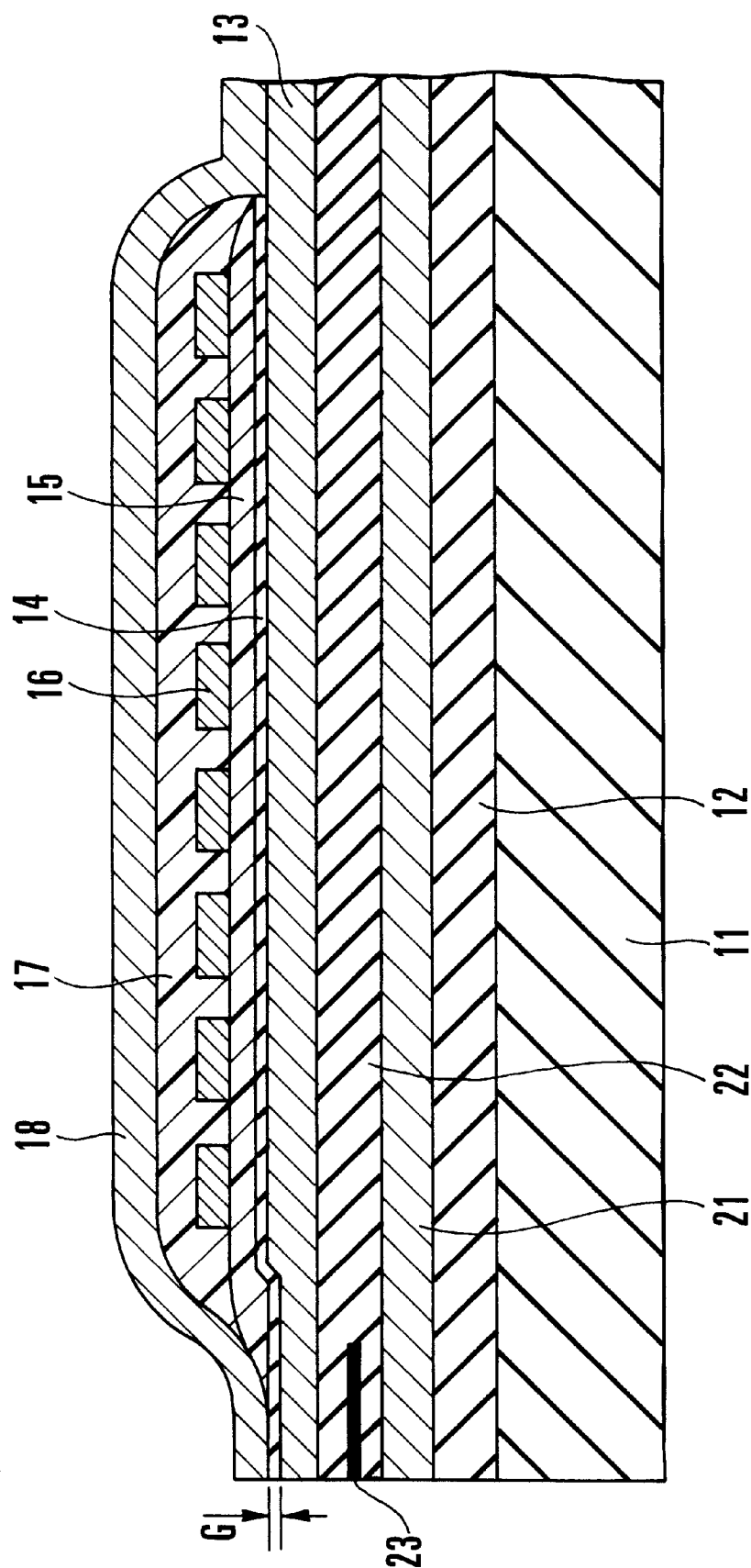
FIG. 7 is a sectional view showing the essential part of a magnetic head according to a third embodiment of the present invention.

A magnetic head according to a third embodiment of the present invention is constructed as shown, in sectional form, in FIG. 7. As shown therein, a magnetic head of a composite structure is provided in which at least one of lower and upper magnetic layers 13 and 18 is formed of a soft magnetic plated film having as main ingredients Co, Ni and Fe (where Co is in the range indicated by 30 at %$\leq$Co$\leq$90 at %, Ni is in the range indicated by 0 at %<Ni$\leq$40 at % and Fe is in the range indicated by 0 at %<Fe$\leq$40 at %) and containing at least S by 0.5 to 4 at %, and in addition, a magnetoresistive (MR) effect element 23 for reproducing information recorded on the recording medium is formed.

In the third embodiment, a lower shield 21 is interposed between the lower magnetic layer 13 and an insulating layer 12 in the form of an alumina sputtered film, and an insulating layer defining an inter-shield gap 22 is formed on the lower shield 21 and the MR element 23 is accommodated in the insulating layer 22.

The MR element 23 referred to herein means an element utilizing the magnetoresistive effect and dedicated to reproduction, and the electrode pattern for conduction of sense current to the MR element, and various kinds of bias applying means for linear operation and Barkhausen noise suppression are not illustrated for avoidance of complexity of illustration.

In the magnetic head constructed as above, a process for manufacture of the MR element 23 is separately needed but it is possible to attain such advantages that optimum design of the reproducing head and recording head can be allowed, high sensitivity and high output properties of the MR film can be utilized to permit high reproduction outputs to be obtained even during high density recording, and the reproduction outputs need not be obtained with the conventional electromagnetic induction type thin film head, and therefore the number of turns of the coil can be decreased and head noise can be decreased to advantage.

In the third embodiment, the construction of FIG. 7 is exemplified in which the whole of at least one of the lower magnetic layer 13 and upper magnetic layer 18 is formed of the soft magnetic plated film of the present invention but the thin film magnetic head in which a part of the medium opposing surface of the upper or lower magnetic layer is formed of the soft magnetic plated film as described in connection with the second embodiment (FIG. 6) may be composite with the MR element.

(Fourth Embodiment)

In a fourth embodiment, an applied example of the magnetic heads according to the first to third embodiments will be described.

Figure 8:
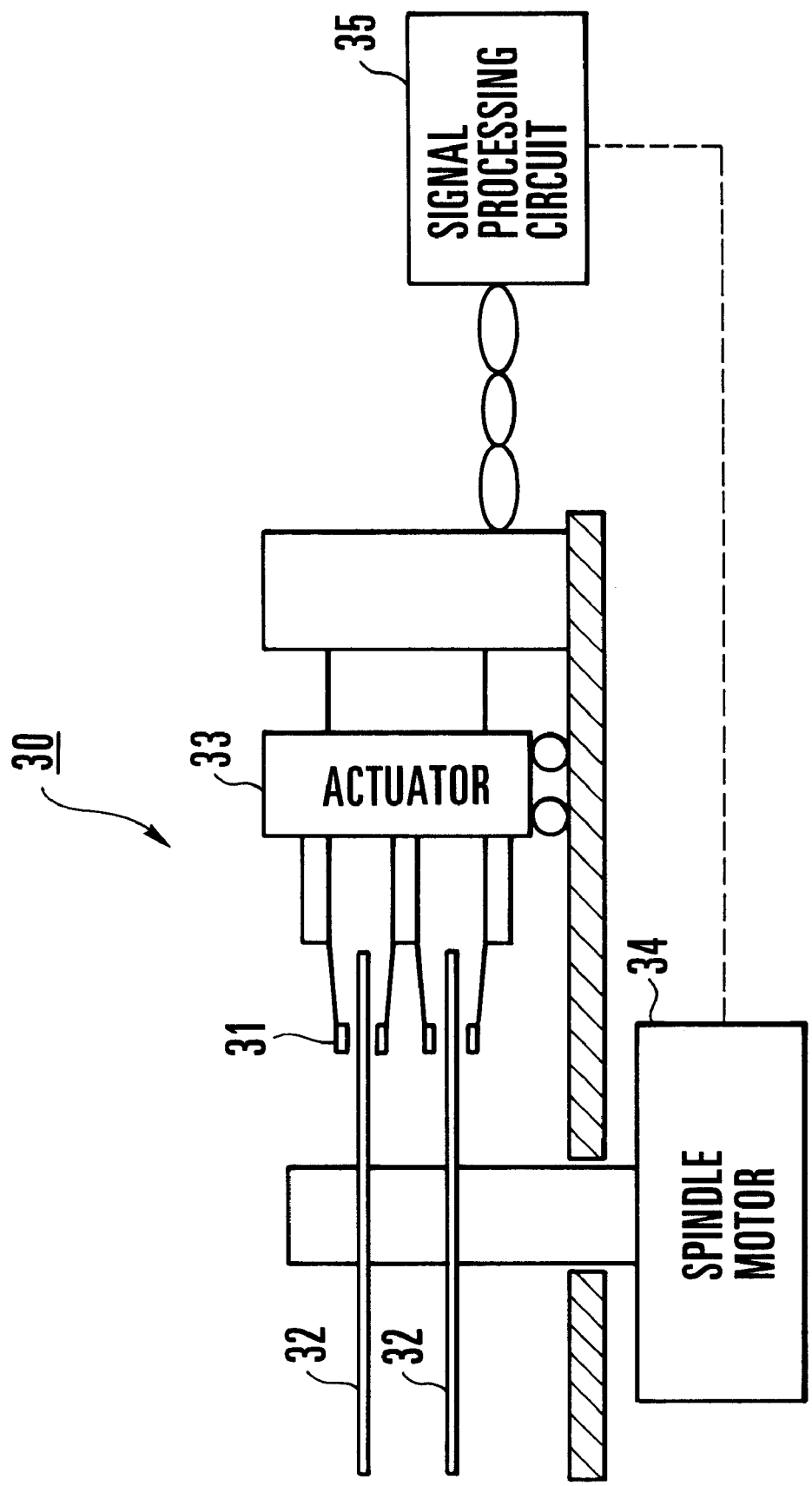
FIG. 8 is a schematic diagram of a magnetic storage unit using the magnetic head according to the first, second or third embodiment of the present invention.

Referring to FIG. 8, there is illustrated a magnetic storage unit 30 using the magnetic head according to the first, second or third embodiment of the present invention. The magnetic storage unit 30 of FIG. 8 comprises head sliders 31 each carrying the magnetic head, magnetic recording media 32 (so-called magnetic discs), an actuator 33 and a spindle motor 34. The spindle motor 34 is electrically connected to a signal processing system 35, as shown at dotted line in the figure.

In the magnetic storage unit 30, the magnetic recording medium 32 comprised of a magnetic disc is rotated by the spindle motor 34. The actuator 33 positions the head slider 31 at a predetermined track on the magnetic recording medium 32. The magnetic head on the head slider 31 is connected to the signal processing system 35.

A given electric signal is recorded as magnetic information on the magnetic recording medium 32 by means of the magnetic head formed on the head slider as described previously or a magnetic signal on the magnetic recording medium 32 is detected by the magnetic head and obtained in the form of an electrical signal through the signal processing system 35. In the case of the head composite with the MR element, a reproduction output of the MR element is detected and obtained in the form of an electric signal through the signal processing system 35.

By using the output of the magnetic head or the output of the MR element in the magnetic head composite with the MR element according to the third embodiment, a position on a track is detected and the actuator 33 is so controlled as to position the head slider 31, thereby moving the magnetic head to a desired track.

Concrete examples of manufacture of the magnetic heads according to the present invention will be described hereunder.

EXAMPLE 1

In example 1, the plated soft magnetic film will be described.

A glass substrate of a thickness of 0.3 mm is washed through substrate washing process and a Ti/Ni—Fe plating underlayer is formed through sputter process. The plating underlayer has a thickness of 5 nm for Ti and a thickness of 50 nm for Ni—Fe. By using the plating underlayer thus formed, a soft magnetic film is formed through plating bath as indicated in the following Table 1.

TABLE 1

|  | bath No. 1 | bath No. 2 | bath No. 3 | bath No. 4 |
|---|---|---|---|---|
| cobalt sulfate | 0.06 | 0.09 | 0.048 | 0.0275 |
| nickel sulfate | 0.2 | 0.2 | 0.2 | 0.2 |
| iron sulfate | 0.015 | 0.01 | 0.002 | 0.02 |
| thiourea (g/l) | 0.02 | 0.02 | 0.02 | 0.02 |
| boric acid | 0.4 | 0.4 | 0.4 | 0.4 |
| ammonium chloride | 0.28 | 0.28 | 0.28 | 0.28 |
| sodium dodecyl-sulfate (g/l) | 0.01 | 0.01 | 0.01 | 0.01 |

Note) The unit other than that described explicitly in Table 1 is $mol/dm^3$.

The plating condition is that the pH is 2.8, the bath temperature is room temperature (about 20° C.), the anode is of platinum, the current density is 20 $mA/cm^2$ and the electrode revolution number is 1000 rpm.

For comparison, plating for formation of a magnetic film is carried out by using plating bath of the following bath composition with the addition agent changed from thiourea to the conventional saccharin sodium.

[Composition of Comparison Bath]

Cobalt sulfate: 0.0475, nickel sulfate: 0.2, iron sulfate: 0.0025, saccharin sodium: 2(g/l), boric acid: 0.4, ammonium chloride: 0.28, sodium dodecylsulfate: 0.01 (g/l).

The unit other than that explicitly described as above is $mol/dm^3$.

For the film formed through plating bath according to example 1 of the present invention and the film formed by plating using the comparative bath, magnetic characteristics or properties (saturation magnetization Bs and coercive force Hc), resistivity ρ, the film composition and the content of sulfur (S) in the film are measured.

The magnetic characteristics are measured using a vibratory specimen type magnetometer (VSM) and the resistivity ρ is measured through the four-terminal method. In connection with the film composition, elements of atomic numbers of 9 or more are measured through fluorescence X-ray analysis method and the sulfur amount in the film is separately analyzed quantitatively by using a carbon/sulfur analyzer.

Measured values of the soft magnetic plated films formed through the respective bath processes are summarized in the following Tables 2 and 3.

TABLE 2

Measured values of the films formed through plating bath according to the present invention

|  | bath No. 1 | bath No. 2 | bath No. 3 | bath No. 4 |
|---|---|---|---|---|
| film composition (at %) | $Co_{73}Ni_{11}Fe_{15}$ | $Co_{80}Ni_9Fe_{10}$ | $Co_{76}Ni_{17}Fe_7$ | $Co_{45}Ni_{24}Fe_{30}$ |
| saturation magnetization Bs(T) | 1.7 | 1.8 | 1.6 | 1.8 |
| coercive force Hc(Oe) | 1.0 | 2.0 | 2.2 | 4.0 |
| resistivity ρ ($\mu\Omega \cdot cm$) | 51 | 50 | 54 | 53 |
| sulfur content (at %) | 1.0 | 1.0 | 1.0 | 1.0 |

TABLE 3

Measured values of the film plated through the comparative bath

|  | comparative bath |
|---|---|
| film composition (at %) | $Co_{75}Ni_{15.7}Fe_9$ |
| saturation magnetization Bs (T) | 1.6 |
| coercive force Hc (Oe) | 6.5 |
| resistivity ρ ($\mu\Omega \cdot cm$) | 22 |
| sulfur content (at %) | 0.3 |

As will be seen from the above Tables 2 and 3, in the soft magnetic film according to example 1 of the present invention, for any bath numbers, the Bs is more than 1.5 T, the coercive force is less than 5 Oe and the resistivity has a large value of the order of 50 $\mu\Omega cm$ which is about twice that of the conventional permalloy film.

In the film formed through the comparative bath, however, the Bs is surely large, amounting up to 1.6 T but the coercive force Hc has a large value of 6.5 Oe and conversely the resistivity has a value of 22 $\mu\Omega cm$ which is comparable to that of the permalloy film.

As described above, the soft magnetic film according to example 1 of the present invention has a high Bs ($\geq 1.5$ T), a low coercive force ($\leq 5$ Oe) and a high resistivity ρ (about 50 $\mu\Omega cm$), exhibiting an excellent characteristic of the pole material of the magnetic head.

EXAMPLE 2

As shown in FIG. 1, an insulating layer 12 of alumina film having a thickness of about 15 $\mu m$ is formed an a substrate 11 of $Al_2O_3$—TiC through sputtering process. The sputtering condition is that the making power is 5 kW and the Ar pressure is 5 mTorr. Subsequently, a plating underlayer of Ti/Ni—Fe film (Ni having a thickness of 5 nm and Ni—Fe having a thickness of 100 nm) is formed through sputtering process. The film forming condition is that the making power is 600 W and the Ar pressure is 5 mTorr, and uniaxial anisotropy is applied by means of a permanent magnet (of 500 Oe magnetic field intensity) during film formation. Thereafter, positive PR of novolak resin system is coated to a thickness of 88 $\mu$m to form a PR frame pattern corresponding to the shape of the lower magnetic layer. The track width is 2 $\mu$m.

Then, plating bath is established in which cobalt sulfate is of 0.06, nickel sulfate is of 0.2, iron sulfate is of 0.015, boric acid is of 0.4, ammonium chloride is of 0.28 (for the above components, the unit is mol/dm$^3$), dodecyl sulfuric acid is of 0.01 and thiourea is of 0.015 (for the above components, the unit is g/l), plating is carried out under the condition that the pH is 2.8, the bath temperature is 20° C. or less, the anode is of platinum and the current density is 20 mA/cm$^2$ to form a lower magnetic layer 13 of $Co_{73}Ni_{11}Fe_{15}$ (at %) containing sulfur by 1 at %. During plating, a magnetic field of about 500 Oe is applied to the substrate from the outside of the plated layer and suitable stirring is carried out to secure uniformity of the plated film.

Thereafter, an insulating layer 14 in the form of an alumina sputtered film defining a gap is formed. The film forming condition is that the making power is 600 W, the Ar pressure is 5 mTorr and the film thickness is 0.3 $\mu$m.

Subsequently, an organic layer 15 for elimination of stepped portions on the lower magnetic layer 13 is formed by PR of novolak system. In order to form the organic layer 15 for elimination of the stepped portions which has a thickness of 5 $\mu$m, the PR layer is patterned by the light-exposing and developing technique and the resulting PR pattern is thermally hardened by a heat treatment carried out in atmosphere for one hour at 250° C.

Then, a Ti/Cu laminated plating underlayer (Ti having a thickness of 5 nm and Cu having a thickness of 50 nm) is formed through sputtering process. The film forming condition is that the making power is 600 W and the Ar pressure is 5 mTorr.

Next, a PR pattern corresponding to a predetermined coil shape is formed by light-exposure and development and a Cu film of 3 $\mu$m thickness is precipitated in copper sulfate plating bath to form a coil 16 having 12 turns. Thereafter, in order to eliminate stepped portions of the coil pattern, an organic layer 17 is formed in quite the same manner in the case of-elimination of the stepped portions on the lower magnetic layer 13.

Further, exactly like the lower magnetic layer 13, a film of $Co_{73}Ni_{11}Fe_{15}$ (at %) containing sulfur by 1 at % is formed which serves as an upper magnetic layer 18.

Finally, an overcoat layer in the form of an alumina sputtered film of 30 $\mu$m thickness is formed under the condition that the making power is 5 kW and the Ar pressure is 5 mTorr, thus completing the wafer process.

In addition, known mechanical working/polishing working described in, for example, JP-A-50-104916 is carried out to manufacture a head slider and evaluation of the magnetic head, especially, evaluation of recording characteristics is made. The evaluation is made under the condition that the medium coercive force is 3000 Oe, the magnetic spacing is 100 nm, the magnetic recording medium revolution number is 5400 rpm, and the recording current is 25 mA. Thus, with the manufactured magnetic head of example 2 according to the present invention, a sufficient over write (O/W) characteristic exhibiting −35 dB can be obtained at Bs of 1.7 T and $\rho$ of 5 $\mu\Omega$cm.

On the other hand, with the magnetic head manufactured similarly to the magnetic head according to the example 2 of the present invention with the only exception that the magnetic pole material is conventional permalloy (Bs: 1 T and $\rho$: 20 $\mu\Omega$cm), an O/W value obtained is mere −22 dB. When information bits recorded on the magnetic disc are observed through magnetic force microscopy (MFM), it is proven that in comparison with bits recorded with the magnetic head using the permalloy magnetic poles, bits can be recorded up to a higher frequency region with the magnetic head according to example 2 of the present invention without being disturbed at the bit end and between bits.

EXAMPLE 3

Like the example 2, an insulating layer 12 in the form of an alumina film of about 15 $\mu$m is formed on a substrate 11 of $Al_2O_3$—TiC through sputtering process as shown in FIG. 6, and a plating underlayer in the form of a Ti/Ni—Fe film (Ti having a thickness of 5 nm and Ni—Fe having a thickness of 100 nm) is then formed. Subsequently, a lower magnetic layer 13 of $Co_{73}Ni_{11}Fe_{15}$ (at %) containing sulfur by 1 at % is formed and in addition, an organic layer 15 for elimination of stepped portions (hereinafter referred to as first organic layer), a coil 16 and a second organic layer 17 are formed.

Thereafter, as in the case of the formation of the lower magnetic layer 13, a plating underlayer of Ti/Ni—Fe is formed and then, at only a medium opposing surface of the upper magnetic layer 18, a soft magnetic pattern of $Co_{73}Ni_{11}Fe_{15}$ (at %) containing sulfur by 1 at % is precipitated by using the same plating bath as that for the lower magnetic layer 13. Next, a pattern of upper magnetic layer 18 of permalloy is so formed as to maintain magnetic continuity with the soft magnetic plated film pattern 19, thereby forming a magnetic circuit.

Thereafter, like the example 2, the remaining wafer process and the mechanical working/polishing working are carried out to manufacture a head slider and as in the case of the example 2, the magnetic head, especially, recording characteristics are evaluated. As a result, an O/W value of −30 dB can be obtained.

In the example 3 of the present invention, the manufacture process of the upper magnetic layer is divided into two steps and the process is complicated in this respect. But in comparison with the case where the upper magnetic layer is formed through one step, the accuracy of formation of the PR frame pattern can be improved drastically, attaining a meritorious advantage that the track width can be prescribed with higher accuracy.

EXAMPLE 4

As shown in FIG. 7, an insulating layer 12 in the form of an alumina film of about 15 $\mu$m thickness is formed on a substrate 11 of $Al_2O_3$—TiC through sputtering process and then, a sputtered permalloy film of 2 $\mu$m is formed. The film forming condition is that the making power is 600 W and the Ar pressure is 5 mTorr, and uniaxial anisotropy is applied by means of a permanent magnet during film formation. Thereafter, the sputtered permalloy film is worked into a lower shield 21 of a predetermined shape through photo-lithographic techniques and then a part of inter-shield gap 22 in the form of a 20 nm thickness alumina sputtered film is formed. Subsequently, a MR film in the form of a Ni—Fe/Ta/CoZrMo laminated film is formed. The condition for formation of the above film is that the making power is 600 W and the Ar pressure is 5 mTorr, and a magnetic field of 500 Oe is applied by means of a permanent magnet during film formation.

Next, the MR film is worked to a predetermined shape through ion etching process, thus providing a MR element 23. Subsequently, the remaining inter-shield gap 22 and an electrode pattern for conduction of sense current to the MR element 23 or a pattern of longitudinal bias application for suppression of noise of the MR element 23 are formed. Here, the electrode pattern is formed of a Ta/Au laminated sputtered film and the longitudinal bias application pattern is constructed by arranging a hard film of Co, Cr or Pt to the MR element pattern end.

Subsequently, quite like the example 2, a lower magnetic layer 13 (in this example, also playing the role of an upper shield) in the form of a film of $Co_{73}Ni_{11}Fe_{15}$ (at %) containing sulfur by 1 at %, an insulating layer 14 for defining a recording gap, an organic layer 15 for elimination of stepped portion, a coil 16 (having 8 turns), an organic layer 17 for elimination of stepped portions, an upper magnetic layer 18 resembling the lower magnetic layer 13 by taking the form of a film of $Co_{73}Ni_{11}Fe_{15}$ (at %) containing sulfur by 1 at % and an overcoat layer not shown are formed.

Finally, like the foregoing, mechanical working/polishing working is carried out to manufacture a head slider and the magnetic head especially recording characteristics are evaluated under the same condition as that in the example 2. Thus, with the manufactured magnetic head according to the example 4 of the present invention (Bs:1.7 T and ρ: 51 $\mu\Omega cm$), a sufficient O/W characteristic of −35 dB can be obtained. With the MR element concurrently used, a high reproduction output can be obtained which is about three times that of the example 2.

As has been described in the foregoing, according to the present invention, the soft magnetic film material for magnetic pole having high saturation magnetization ($\geq 1.5$ T), low coercive force ($\leq 5$ Oe) and high resistivity ($\geq 30$ $\mu\Omega cm$) can be realized and each of the magnetic head and the magnetic storage unit using this soft magnetic film can realize a sufficiently large O/W characteristic and a good high-frequency recording characteristic.

What is claimed is:

1. A soft magnetic thin film having, as main ingredients, Co, Ni and Fe and made of a Co—Ni—Fe alloy consisting of 30 to 90 at % Co, less than 40 at % Ni and less than 40 at % Fe and containing at least S by 0.5 to 4 at %.

2. A Co—Ni—Fe alloy plating solution containing metal salts of Co, Ni and Fe and containing, as an addition agent, a sulfur system organic compound comprising at least one kind of thiourea, aminothiathol and thiodiglicollic acid.

3. A Co—Ni—Fe alloy plating solution according to claim 2 which additionally contains, as an addition agent, at least one kind of surfactant and boric acid.

4. A method of manufacturing a soft magnetic thin film by using the Co—Ni—Fe alloy plating solution according to any one of claims 2 or 3 through electrodeposition process under the condition that the pH value is 2 to 6, the temperature is 20° C. to 40° C. and the current density is 1 to 30 $mA/cm^2$, wherein during said electrodeposition, a magnetic field is applied in a predetermined direction to the soft magnetic thin film to be formed.

5. A magnetic head comprising:
    a lower soft magnetic layer and an upper soft magnetic layer which define a magnetic circuit;
    a coil layer formed of an electrically conductive thin film material which crosses said lower soft magnetic layer and said upper soft magnetic layer;
    a gap layer or inter-layer insulating layer formed of a non-magnetic insulating material; and
    electrodes for conducting drive current to said coil layer,
    wherein at least one of said lower and upper soft magnetic layers is formed of a soft magnetic film having as a main constituent a Co—Ni—Fe alloy and containing, as a sub-constituent, S by 0.5 to 4 at % of the total content.

6. A magnetic head wherein a part of a magnetic pole end at a medium opposing surface of at least one of upper and lower magnetic layers which define a magnetic circuit of said magnetic head is formed of a first soft magnetic thin film material having as a main constituent a Co—Ni—Fe alloy film and containing, as a sub-constituent, S by 0.5 to 4 at %, and the remaining part of said magnetic circuit is formed of a second soft magnetic thin film material which is different from said first soft magnetic thin film material.

7. A magnetic head according to claim 6, wherein said second soft magnetic thin film material includes a Ni—Fe plated film.

8. A magnetic head according to claim 6 or 7 which is composite with a reproduction head utilizing the magnetoresistive effect of a single-layer or multilayer ferromagnetic soft magnetic thin film.

9. A magnetic storage unit comprising:
    a magnetic recording medium having at least a plurality of tracks for data recording;
    a magnetoresistive effect element for detecting a magnetic field leaking from magnetic information recorded on said magnetic recording medium;
    a write magnetic head for recording information on said recording medium;
    electrically conductive lead lines for connecting said magnetoresistive effect element and said write head to an external circuit; and
    actuator means for moving said magnetoresistive effect element and said write head to a predetermined track on said magnetic recording medium,
    wherein said magnetic recording medium has a coercive force of more than 2000 Oe, a magnetic pole material defining a magnetic circuit of said write head is a soft magnetic thin film essentially consisting of S in the range of 0.5 to 4 at % and a remaining alloy having as main ingredients Co, Ni and Fe where said alloy consists of 30 to 90 at % Co, less than 40 at % Ni and less than 40 at % Fe.

* * * * *